3,781,231
PHYSICALLY REINFORCED HYDROPHILIC FOAM
AND METHOD OF PREPARING SAME
Edward W. Janssen, Roseville, and Robert C. Kyle,
Minneapolis, Minn., assignors to Minnesota Mining and
Manufacturing Company, St. Paul, Minn.
No Drawing. Filed Sept. 17, 1971, Ser. No. 181,559
Int. Cl. C08g 22/44, 51/14
U.S. Cl. 260—2.5 BE          6 Claims

ABSTRACT OF THE DISCLOSURE

Resilient, relatively dense, open-celled, filled polyoxyalkylene/polyisocyanate foam compositions of high resistance to bottoming out which are highly hydrophilic and dimensionally stable with absorption of water, and a process for the preparation of these compositions.

The present invention relates to resilient, relatively dense, open-celled, filled, polyoxyalkylene/polyisocyanate foam compositions of high resistance to bottoming out. In addition, the compositions are highly hydrophilic and dimensionally stable with absorption of water. The invention also relates to a process for the preparation of these compositions.

The ability to combine hydrophilicity and a high degree of dimensional stability with absorption of water with the excellent mechanical properties of these compositions is of basic importance in the present compositions. Due to their hydrophilic nature, a considerable amount of the water they absorb under conditions of high humidity (and release under conditions of lower humidity) is "bound" water which is absorbed by the composition itself and cannot be removed by pressure or wringing out. This is in contrast to hydrophobic foams in which water taken into the void spaces can be all or substantially all removed by pressure.

The combination of properties of the compositions of the invention, which is unique, renders them particularly suited for use in cushion applications in which the material is used in close proximity to the surface of the human body. Exemplary of such applications is the shoe insole. Shoe insoles are used to obtain resilience, support and comfort for the foot whether the wearer is sitting, standing, walking or running. To provide the necessary resilience and support, the composition must, in a thickness of the order of ⅛ of an inch, resist "bottoming out" (i.e. reaching an essentially uncompressible state) even under the relatively high pressures (e.g. up to 20–30 pounds per square inch). At the same time it is desirable that the insole be relatively soft under low pressures (i.e. have relatively high deflection at low load). Insoles must also spring back to full thickness after repeated or prolonged compressions under the conditions of use (i.e. have low compression set).

BACKGROUND OF THE INVENTION

Certain previously known shoe insoles have utilized foams. These, however, are closed cell, hydrophobic foams. The closed cell structure is necessary in the compositions used to obtain both the needed resistance to bottoming out at high load and the softness at low load, and to achieve them in the necessarily thin cross section of shoe insoles. These, however, are quite uncomfortable. The closed cell structure of the foam (which does not breathe) does not allow the heat generated by the foot to dissipate or the moisture from prespiration to be removed from the surface of the foot. Even had it been possible to develop sufficient load carrying properties with insoles of open celled foams of the hydrophobic types previously used, there would have been considerable discomfort, since, under high loads, the moisture would be squeezed back out of the foam and into contact with the foot. These problems of heat and moisture, furthermore, became considerably more acute when the wearer is walking, running or otherwise exercising, since both are then generated by the foot in considerably greater quantities. The pressures and frequency of flexing are also greater when the wearer is exercising.

Foams of the same chemical type as those used as binders in the present materials, i.e. polyoxyalkylene/polyiscoyanate type polyurethane foams, have been disclosed heretofore, e.g. see U.S. Pats. 2,949,431, 2,965,584, 3,413,245, 3,021,290 and 3,457,203. These foams are of use as sponges, washcloths, mops, etc. but generally are unsatisfactory in cushioning products designed to bear weight since they do not also combine the properties of density, strength, firmness and resilience in sufficient degree. In some applications also, including that of shoe insoles, the considerable expansion of these foams upon absorption of water cannot be tolerated.

The polyurethane foam art also includes disclosures of foams which contain fillers and which can be used as cushions. Such foams, however, lack the combination of properties of the present materials and would not be satisfactory in their primary areas of use. Thus, U.S. Pat. 3,021,290 discloses foams prepared from a polyalkylene ether glycol, an organic polyisocyanate having two to three functional isocyanate groups, an activator mixture comprising a small amount of water (not more than 5 percent of the weight of the glycol and the isocyanate) together with a reaction catalyst and a wood cellulose filler (a mineral filler such as talc, calcium carbonate, etc. can also be added). Considerable heat is required to bring about the foaming reaction to produce the compositions of this patent (e.g. 1 hour at 115 to 120° C., room temperature for 16 hours then 115 to 120° C. for an additional 8 hours). The resulting foams are disclosed in the patent to have densities between 2 and 3 pounds per cubic foot, and compress to 50 percent of their initial thickness under pressures of about 0.8 pound per square inch. Thus, they are in no way comparable to the present foams.

DESCRIPTION OF THE INVENTION

More specifically the invention relates to physically reinforced, resiliant, cross-linked, hydrophilic, open-celled foam material comprising 100 parts of polyoxyalkylene urea binder containing dispersed therein 40–300 parts of a filler wherein the binder consists essentially of recurring urea functions separated by aromatic hydrocarbon groups and oxyalkylene chains, at least 50 percent of which are oxyethylene chains, and the filler comprises solid elastomeric particles ground to pass at least through a screen having .078 inch (i.e. ⁵⁄₆₄ inch or 0.2 millimeter) openings, said foam material having (1) a bound water pickup capacity of at least 50 percent,
(2) a density of from 15 to 40 pounds per cubic foot 0.24–0.64 gms. per cc.),
(3) an area change upon saturation with water of not more than about 40 percent,
(4) a twenty-four hour compression set of less than 25 percent, and
(5) a compressive strength to 50 percent depression greater than 15 pounds per square inch ($1.05 \times 10^3$ gms. per square centimeter).

The compositions of the invention preferred for shoe insoles are those comprising 100 parts of the polyoxyalkylene urea binder containing dispersed therein 100–300 parts of the filler and having (1) a bound water pickup capacity of at least 50 percent,
(2) a density of from 20 to 40 pounds per cubic foot (0.32–0.64 gms. per cc.),
(3) an area change upon saturation with water of not more than about 25 percent,
(4) a twenty-four hour compression of less than 25 percent, and
(5) a compressive strength to 50 percent depression greater than 15 pounds per square inch ($1.05 \times 10^3$ gms. per square centimeter).

Generally speaking, the compositions of the invention defined above as preferred for shoe insoles bottom out at pressures of 40 pounds per square inch ($2.8 \times 10^3$ gms. per square centimeter) or greater. Particularly preferred for use as shoe insoles are those compositions having from 100 to 250 parts of filler per 100 parts of binder, since the compositions in this range generally develop superior compression set and compressive strength properties while the filler to binder ratio is sufficiently low to ensure ease of preparation.

The foamed compositions of the invention may be obtained in the form of films of various thickness or may be shaped by casting. The surface thereof has a tough skin which, nevertheless, has the same moisture absorptivity as the body of the foam because of the hydrophilic nature of the polymer. The skin is such that articles, such as cushions and pads, molded the foam are form-stable, tear-resistant and smooth and, therefore, do not require a protective fabric or coating thereon.

The foams are epsecially useful in cushions and pads used in contact with the human body as, for example, protective pads for athletes, (e.g. knee pads, kidney pads, shoulder pads and helmet liners), sweat bands for use in hats, and head coverings per se, pads for underarm protection of clothing, and, of course, shoe and boot insoles. The foams may also be used in other cushioning and absorbing applications, such as cushions for chairs, sofas, automobiles and other vehicles, etc. When used in shoe (or boot) insoles, the foam provides a good supporting foundation for the foot which is equal to or better than leather in its softness, moisture absorption and moisture and air permeability. Insoles may be cut to shoe sole shape from sheets of the foam that have been cast to be ⅛ inch (.3 cm.) or more in thickness and that have a tough surface skin, or from sheets skived from loaves of the foam.

The compositions of the present invention are prepared by (1) Forming an intimate physical blend of 100 parts of a linear isocyantae-terminated polyoxyalkylene prepolymer (I) in which at least 50 percent (by weight) of the oxyalkylene groups are oxyethylene and from 40 to 300 parts of a solid elastomeric particle ground to pass through a screen having .078 inch openings (a No. 10 U.S. Standard Sieve) (II) in a ketone or chlorinated hydrocarbon diluent (III),
(2) Mixing at least 20 parts of water (IX) into the foregoing blend at a temperature of 10° C. or below, and
(3) Maintaining the mixture at a temperature below 25° C. until the resulting chemical reaction is substantially complete and a solid foam has been formed.

The blend of I, II and III does not react chemically. However, when it is mixed with the water, IV, foaming, chain extending and cross-linking reactions take place simultaneously and rapidly. The speed of reaction will vary somewhat depending upon the particular materials present, and the concentrations thereof but generally if the constituents are at room temperature (25° C.) when they are combined, the mixture must be coated, cast or molded within one minute. If the components are cooled to ice temperature (about 0° C.) before mixing, the time can be extended to 2 to 3 minutes, or in some cases to as long as 10 minutes. The composition foams quickly, usually within 2–5 minutes at room temperature. Within 2 hours or less at room temperature (often within 30 minutes) the reaction is substantially complete and the composition has reached its final physical properties.

Water is present in a very large stoichiometric excess (with respect to all of the isocyanate groups charged). This insures that all of the isocyante groups will be consumed in the reaction. In addition, the water acts as a heat sink to maintain the reaction temperature below 25° C. The preferred weight ratio of water to the prepolymer I is from about 0.5 to 1.5.

The reaction temperature is maintained below 25° C., and preferably from 0 to 10° C., to ensure development of the density and strength characteristics of the compositions. It has been found that if the temperature is allowed to rise to higher temperatures, the resulting foamed material is much less dense.

Upon mixing the constituents (I, II, IV and usually III and, if desired, additives of the types mentioned elsewhere herein) the mass is immediately cast into its desired final shape, e.g. in molds or is coated as a sheet. Thus, it can be conveniently knife coated onto a moving web having a release surface (such as polyethylene coated paper) after which it foams. The foamed material can be either allowed to set and cross-link with the top surface free or it can be levelled and given a predetermined thickness by passing it through a metering gap. At that time a second web with a release surface can, if desired, be applied to the top surface of the foam. The release web or webs can be removed as soon as the foam has finished reacting and cross-linking or can be left in place for storage.

A wide variety of fibrous assemblies (including woven and non-woven fabrics, compressible mats, etc.) can be used in connection with the foamed compositions of the present invention. These can be adhered to one or both sides of already formed foam (e.g. using a spray adhesive), the foam can be formed in contact with a fibrous assembly or between two assemblies or the assembly can be impregnated with the liquid foam-forming composition and the latter then foamed. Such fibrous assemblies impart desirable properties to the overall composite such as improved tensile properties, increased dimensional stability and surface toughness and strength. Normally they are breathable, particularly the fabrics used on the surface of the foam (in order to take advantage of the hydrophilic nature of the foam).

If desired, a fibrous assembly can be compressed or molded during or just after foaming or prior to combining with the foamed composition and correspondingly a wide variety of products can be obtained. The assembly of fibers can be a mat of interpenetrated crimped continuous fibers which, when coated and impregnated with the compositions of the invention, form a leather-like sheet material. Another satisfactory fibrous assembly is non-woven nylon fabric such as, for example, nylon scrim.

In a preferred embodiment, the fibrous assembly is passed through a needle punching machine to effect consolidation of the assembly. The punched assembly is then impregnated with the liquid foam forming composition of the invention. Alternatively, the foam can be prepared separately and a fiber assembly, such as a random webbed material of rayon nylon, etc., needle punched directly onto (and through) the foam using 30–50 punches per square inch, with or without an adhesive. The fibrous assemblies in these embodiments provide a pleasant feel and additional resistance to swelling of the foam on absorption of moisture.

Another preferred method of combining a fibrous web and a foamed sheet of the invention is to cover a skived foam sheet with a non-woven web of natural or synthetic fibers. This may be done by forming a non-woven web of fibers, such as, For example, a non-woven web from one inch staple, 4 denier, Dacron fibers or nylon fibers superimposing the non-woven web onto the skived foam sheet, and subjecting the assembly to needle punching. Machines suitable for needle punching and for preparing non-woven webs are available respectively from the James Hunter Corporation of North Adams, Mass., and the Curlator Corporation of East Rochester, N.Y. (the latter under the trade designation "Rando-Webber").

Methods of preparing prepolymer precursors I of the general type used in the present invention are disclosed in the art. See for example U.S. Pats. 2,726,219 and 2,948,691 and "Polyurethanes: Chemistry and Technology," by Saunders and Frisch, Part I, Interscience Publishers, New York (1962). Prepolymers of this type suitable for use in the present invention are generally those in which at least half of the repeating alkylene oxide groups are ethylene oxide groups, with the remainder being other lower alkylene oxide groups, such as propylene oxide and butylene oxide groups. In some cases, however, certain recurring functional groups on the chain (such as hydroxyl groups) can be used in place of ethylene oxide groups to produce a hydrophilic foamed composition.

Ordinarily the prepolymers are prepared by reacting a polyoxyalkylene polyol with a polyisocyanate using a NCO/OH equivalent ratio of at least 2/1 or slightly higher, e.g. 2.1/1 to 2.5/1.

Broadly speaking, the polyoxyalkylene polyols are water soluble and have molecular weights of at least 500 and as high as 6000 (preferably between about 600 and 2000). The most preferred polyols are polyoxyethylene diols having molecular weights between about 600 and 1500.

Generally the higher the molecular weight of the polyol the tougher and denser are the foams prepared therefrom. Also, the higher the ratio of oxypropylene or other oxyalkylene units to oxyethylene units in those polyols, the greater is the resistance to compression set and the lower is the moisture absorption capacity of the foams prepared therefrom.

Commercially available polyols suitable for use in preparing the prepolymers I are: oxyethylene-oxypropylene block copolymer polyols available (from the Wyandotte Chemicals Corporation) under the trade designation "Pluronic," e.g. "Pluronic" "L35," "F38" and "P46"; hydrophilic oxyethylene-oxypropylene random copolymer polyols available commercially under the trade designations "Polyol Functional Fluids" "W1260" and "WL580"; and polyethylene glycols available (from the Union Carbide and Carbon Corporation) under the trade designation "Carbowax," e.g. "Carbowax" "600," "1000," "1540" and "4000."

A particularly preferred prepolymer for use in the present invention is the reaction product of 1 mole of hydroxyl-terminated polyethylene glycol 1000 (containing approximately 23 repeating ethylene oxide units) with 2 moles of toluene diisocyanate. In this prepolymer and in other similar prepolymers prepared by reactions between diols and diisocyanates, 2 urethane linkages are formed.

The prepolymers I having 2 or more isocyanate functions can be prepared by the reaction of a suitable polyoxyalkylene diol, $HO(RO)_mROH$ wherein R is a lower alkylene group and $m$ is 5–50, with an aromatic isocyanate compound having 2 or more isocyanate functions $R'(NCO)_n$ wherein R' is an aromatic hydrocarbyl residue (e.g. containing up to 18 carbon atoms) and $n$ is 2–6. The residue R' can contain a minor amount of aliphatic structure but is primarily aromatic. Alternatively, the prepolymers can be prepared by reacting a difunctional isocyanate-terminated polyoxyalkylene prepolymer with a compound which is polyfunctional with respect to Zerewitinoff active hydrogen (see JACS 49, 3181 (1927)), $R^2[H]_p$ wherein $R^2$ is an organic group, [H] is active hydrogen and $p$ is 2–6.

In addition, these two methods of preparing hydrophilic polymers containing more than 2 isocyanates can be combined. Generally, however, it is preferred that the prepolymers contain not more than 3 isocyanate groups per molecule, most preferably 2.

The elastomeric particles are conveniently and preferably ground tire stock, although other dense elastomeric materials (whether of scrap or virgin stock) can be used. Preferably, also, the particles are of a size that they will just pass through a No. 16 U.S. Standard Sieve (openings 0.047 inch) although larger or smaller particles can also be used.

Other materials which may be incorporated into the hydrophilic foamed compositions of the invention may also include additives such as catalysts, surfactants (to aid in mixing the components of the foam), pigments (to provide color), fibers such as nylon, rayon, etc. preferably cut into short pieces of the order of 0.5 inch or less, and mineral fillers such as finely divided calcium carbonate, talc, mica, etc. In addition, medicaments (to provide therapeutic character to the foams), plasticizers, anti-oxidants and prefumes may be added. Absorbent charcoal can also be employed.

Although the hydrophilic foams of the invention are preferably prepared without a catalyst (since it is usually more convenient to reduce the speed of reaction) a catalyst can be used to promote the formation of urea bonds. Appropriate catalysts include, but are not limited to, N-methyl morpholine, N-hydroxyethyl morpholine and triethylene diamine. Typical metallic salt catalysts include, for example, the salts of antimony, tin, iron, lead and mercury, e.g. dibutyltin dilaurate, stannous octoate, phenyl mercuric acetate and the like. Broadly speaking, the catalyst, when used, is employed in an amount ranging from about 0.05 to about 1.0, and preferably from about 0.1 to about 0.4 percent, by weight of the prepolymer I.

Suitable surfactants are known to the art and include polyoxyethylene derivatives of alkyl and aryl hydroxy and carboxy compounds and sulfonated alkyl and aryl compounds, fatty acid soaps, e.g. calcium octoate, and fluorocarbon surfactants.

The following are test procedures used in characterizing and defining the products of the invention.

Water absorbing capacity

The water absorbing capacity (or free water pickup) $\Delta W_f$, is determined by weighing a sample of foam previously dried for 2 hours at 160° F. (71° C.) ($W_1$) and completely saturating it with water by squeezing the foam under water at about 25° C. until the air is expelled, and holding the foam under water with weights for 15 minutes. The water saturated foam is then removed from the water using a tared metal hook and allowed to hang until excess surface water has dripped off. The saturated samples is immediately weighed ($W_2$) and the free water pickup is calculated using the formula $$\Delta W_f = \frac{W_2 - W_1}{W_1} \times 100$$

where $\Delta W_f$ is the free water pickup measured as percent weight gain. It is a measure of the total amount of water that may be held by the foam and includes both the water held mechanically in the open pores of the foam and the water absorbed into the cell walls of the foam.

Density

The density, in pounds per cubic foot is determined using foam previously dried for 2 hours at 160° F.

Bound water pickup

Bound water pickup is determined by compressing the water saturated sample from the determination of the water absorbing capacity until no more water can be forcibly expelled from the sample. The sample is then weighed ($W_3$) and the bound water pickup $\Delta W_b$ calculated using the formula $$\Delta W_b = \frac{W_3 - W_1}{W_1} \times 100$$

where $W_1$ is as previously defined and $W_b$ is the bound water pickup measured as percent weight gain. It is a measure of the water absorbed into the cell walls of the foam.

Volume change with water absorption

The volume change, $\Delta V$, is calculated (as a percentage figure) using the formula $$\Delta V = \frac{V_2 - V_1}{V_1} \times 100$$

where $V_1$ is the volume of the dry sample (dried 2 hours at 160° F.) and $V_2$ is the volume of the sample after soaking in water and expelling the free water as in the bound water pickup procedure.

Area change with water absorption

The area in this test refers to largest surface (or opposing surfaces) of the article being tested (e.g. the top or bottom of a sheet). The area change, $\Delta A$, is calculated (as a percentage figure) using the formula $$\Delta A = \frac{A_2 - A_1}{A_1} \times 100$$

where $A_1$ is the area of the dry surface (dried 2 hours at 160° F.) and $A_2$ is the area of the surface after soaking in water and expelling the free water as in the bound water pickup procedure.

Twenty-four hour compression set

The 24-hour compression set, $\Delta C$, is expressed as a percentage and is calculated from the formula $$\Delta C = \frac{T_1 - T_2}{T_1} \times 100$$

where $T_1$ is initial foam thickness, $T_2$ is the thickness of the foam after it has been subjected to a force of 10 pounds per square inch for 24 hours and allowed to relax (free of the force) for one hour. The foam is maintained under ambient conditions (approximately 25° C. and 50 percent relative humidity) throughout this test.

Compressive strength to 50 percent depression

The compressive strength test is run in a conventional testing machine (Instron) at room temperature (about 25° C.) and 50 percent relative humidity on samples substantially at equilibrium under those conditions. The test samples, which are 2 inches square and 1/4 inch thick, are placed on a flat lower platen having a face of larger dimensions than the sample. The test is run by compressing the sample between the lower platen and an upper platen having the same size and shape as the sample (2 inches by 2 inches). The rate of compression is 0.2 inch per minute and the result is recorded as the pressure (in pounds per square inch) reached at 50 percent depression (when the platens are 1/8 inch apart).

The following examples more specifically illustrate the compositions of the invention and the process for their preparation, but are in no way limiting of the scope thereof. The particular constituents used in the examples are representative of the types which they exemplify but could as well be other constituents of the same class. The percentages and parts in the examples and elsewhere herein are by weight unless otherwise stated.

EXAMPLES 1–7

The constituents used are as follows:

The prepolymer. Polyethylene glycol having a molecular weight of 1000 (available commercially from the Union Carbide Corporation under the trade designation "Carbowax 1000") end capped with toluene diisocyanate and having the formula

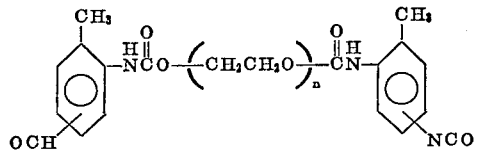

The elastomer. Rubber from tire tread stock ground to pass through a No. 16 U.S. Standard Sieve (openings 3/64 inch=1.2 mm.).

Filler (mineral). Finely ground calcium carbonate.

Fiber. 3 denier rayon fiber particles 0.3 inch (about 7.5 millimeters) in length.

Pigment. Mapico Brown iron oxide pigment (color index 77491).

Surface active agent. A polyoxyethylene derivative of fatty acid partial esters of hexitol anhydrides available commercially from the Atlas Powder Company under the trade designation "Tween 80."

The compositions of the examples were prepared as follows: The hydrophilic prepolymer, the solid particulate and fibrous materials and the surface active agent were thoroughly premixed in a stirred vessel in the presence of sufficient acetone to aid the mixing. The water was then added (at about 0° C., partly in the form of ice if desired), thoroughly mixed and the mixture knife coated at a wet thickness of 1/16 of an inch (1.6 millimeters) onto a smooth surface coated with a release agent. The mass foamed to a final thickness of about 1/8 of an inch (3.2 millimeters) within 2 to 5 minutes and cured to full strength within about 30 minutes at room temperature (25° C.).

The compositions of the examples were as follows:

| Example No. | 1[1] | 2[1] | 3 | 4 | 5 | 6 | 7 |
|---|---|---|---|---|---|---|---|
| Prepolymer | 100 | 100 | 100 | 100 | 100 | 140 | 100 |
| Elastomer |  | 200 | 200 | 100 | 200 | 100 |
| Filler |  | 100 |  | 100 | 100 | 100 | 160 |
| Pigment |  |  | 4 | 4 |  | 4 |  |
| Fibers |  |  |  |  |  | 1 | 3 |
| Water[2] | 100 | 100 | 100 | 100 | 100 | 140 | 100 |

[1] Control lots.
[2] One part of surface active agent was added in each example per 100 parts of water.

The properties of the compositions are as follows:

| Example No. | 1 | 2 | 3 | 4 | 5 | 6 | 7 |
|---|---|---|---|---|---|---|---|
| Water absorbing capacity (percent) | 730 | 530 | 168 | 151 | 272 | 130 | 193 |
| Density (lb./ft.³) | 16.7 | 19.8 | 37.2 | 34.1 | 25.6 | 32.8 | 29.6 |
| Bound water pickup (percent) | 200 | 104 | 72 | 54 | 75 | 51 | 69 |
| Volume change with water absorption (percent) | 150 | 100 | 63 | 57 | 52 | 55 | 59 |
| Area change with water absorption (percent) | 79.0 | 45.0 | 25.0 | 20.0 | 18.2 | 13.0 | 16.2 |
| 24 hour compression set (percent) | 45 | 35 | 4 | 4 | 23 | 10 | 16 |
| Compressive strength to 50% depression (lb./ft.²) | 1.5 | 4 | 33 | 35 | 19 | 37 | 22 |

In comparing the compositions of the invention (Examples 3–7) with the controls (Examples 1 and 2) it will be noted that the compositions of the invention are much more dimensionally stable upon saturation with water than the controls; the compositions of the invention are much more resilient after being compressed for 24 hours (have lower compression set) than the controls; and the compositions of the invention resist compression much more strongly (have higher compressive strength) than the controls.

The compositions of all of the examples are open-celled and highly hydrophilic. The compositions of the invention (Examples 3–7) have particularly tough surfaces and are readily slit and skived by automatic equipment.

What is claimed is:

1. A physically reinforced, resilient, cross-linked, hydrophilic, open-celled foam composition comprising 100 parts by weight of a polyoxyalkylene urea binder containing dispersed therein 40–300 parts by weight of a filler, wherein the binder consists essentially of recurring urea functions separated by aromatic hydrocarbon groups and oxyloweralkylene chains, in which at least 50 percent of the repeating oxyalkylene groups are oxyethylene groups and the filler comprises solid, dense, elastomeric particles ground to pass through a screen having .078 inch openings, said foam material having (1) a bound water pickup capacity of at least 50 weight percent,
(2) a density of from 15 to 40 pounds per cubic foot,
(3) an area change upon saturation with water of not more than about 40 percent,
(4) a twenty-four hour compression set of less than 25 percent, and
(5) a compressive strength to 50 percent depression greater than 15 pounds per square inch, said foam being prepared by
(A) forming an intimate physical blend of 100 parts of a linear isocyanate-terminated polyoxyalkylene prepolymer in which at least 50 weight percent of the oxyalkylene groups are oxyethylene and from 40 to 300 parts of the solid elastomeric filler particles in a ketone or chlorinated hydrocarbon diluent,
(B) mixing at least 20 parts of water into the foregoing blend at a temperature of 10° C. or below, and
(C) maintaining the mixture at a temperature below 25° C. until the resulting chemical reaction is substantially complete and the foam has been formed.

2. A foam composition according to claim 1 wherein the oxyalkylene chains are all oxyethylene.

3. A physically reinforced, resilient, cross-linked, hydrophilic, open-celled foam composition comprising 100 parts by weight of a polyoxyalkylene urea binder containing dispersed therein 100–300 parts by weight of a filler, wherein the binder consists essentially of recurring urea functions separated by aromatic hydrocarbon groups and oxyloweralkylene chains, in which at least 50 percent of the repeating oxyalkylene groups are oxyethylene groups, and the filler comprises solid, dense, elastomeric particles ground to pass through a screen having .078 inch openings, said foam material having (1) a bound water pickup capacity of at least 50 weight percent,
(2) a density of from 20 to 40 pounds per cubic foot,
(3) an area change upon saturation with water of not more than about 25 percent,
(4) a twenty-four hour compression set of less than 25 percent, and
(5) a compressive strength to 50 percent depression greater than 15 pounds per square inch, said foam being prepared by
(A) forming an intimate physical blend of 100 parts of a linear isocyanate-terminated polyoxyalkylene prepolymer in which at least 50 weight percent of the oxyalkylene groups are oxyethylene and from 100 to 300 parts of the solid elastomeric filler particles in a ketone or chlorinated hydrocarbon diluent,
(B) mixing at least 20 parts of water into the foregoing blend at a temperature of 10° C. or below, and
(C) maintaining the mixture at a temperature below 25° C. until the resulting chemical reaction is substantially complete and the foam has been formed.

4. A foam composition according to claim 3 wherein the oxyalkylene chains are all oxyethylene.

5. A physically reinforced, resilient, cross-linked, hydrophilic, open-celled foam composition comprising 100 parts by weight of a polyoxyalkylene urea binder containing dispersed thedein 40–300 parts by weight of a filler, wherein the binder consists essentially of recurring urea functions separated by aromatic hydrocarbon groups and oxyloweralkylene chains, in which at least 50 percent of the repeating oxyalkylene groups are oxyethylene groups and the filler comprises tire stock particles ground to pass through a screen having .078 inch openings, said foam material having (1) a bound water pickup capacity of at least 50 weight percent,
(2) a density of from 15 to 40 pounds per cubic foot,
(3) an area change upon saturation with water of not more than about 40 percent,
(4) a twenty-four hour compression set of less than 25 percent, and
(5) a compressive strength to 50 percent depression greater than 15 pounds per square inch, said foam being prepared by
(A) forming an intimate physical blend of 100 parts of a linear isocyanate-terminated polyoxyalkylene prepolymer in which at least 50 weight percent of the oxyalkylene groups are oxyethylene and from 40 to 300 parts of the solid elastomeric filler particles in a ketone or chlorinated hydrocarbon diluent,
(B) mixing at least 20 parts of water into the foregoing blend at a temperature of 10° C. or below, and
(C) maintaining the mixture at a temperature below 25° C. until the resulting chemical reaction is substantially complete and the foam has been formed.

6. A foam composition according to claim 5 wherein the oxyalkylene chains are all oxyethylene.

References Cited
UNITED STATES PATENTS

| | | | |
|---|---|---|---|
| 3,646,178 | 2/1972 | Traübel | 260—2.5 BE |
| 3,457,203 | 7/1969 | Cohen | 260—77.5 AP |
| 2,977,330 | 3/1961 | Brower | 260—2.5 AD |
| 2,965,584 | 12/1960 | Elkin | 260—860 |
| 3,441,523 | 4/1969 | Dwyer | 260—2.5 AK |
| 3,114,722 | 12/1963 | Einhorn | 260—2.5 AK |
| 3,021,290 | 2/1962 | Gmitter | 260—37 N |

FOREIGN PATENTS

| | | | |
|---|---|---|---|
| 1,209,058 | 10/1970 | Great Britain | 260—2.5 AD |
| 922,306 | 3/1963 | Great Britain | 260—2.5 AK |

DONALD E. CZAJA, Primary Examiner

C. W. IVY, Assistant Examiner

U.S. Cl. X.R.

36—44; 260—2.5 AD, 2.5 AK, 2.5 AM